US011202413B2

(12) United States Patent
Schuttler et al.

(10) Patent No.: US 11,202,413 B2
(45) Date of Patent: Dec. 21, 2021

(54) HORTICULTURE FASTENER

(71) Applicant: Avery Dennison Corporation, Glendale, CA (US)

(72) Inventors: David L. Schuttler, Townsend, MA (US); Charles J. Burout, III, Bedford, NH (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 16/466,114

(22) PCT Filed: Dec. 27, 2017

(86) PCT No.: PCT/US2017/068566
§ 371 (c)(1),
(2) Date: Jun. 3, 2019

(87) PCT Pub. No.: WO2018/125927
PCT Pub. Date: Jul. 5, 2018

(65) Prior Publication Data
US 2019/0320592 A1  Oct. 24, 2019

Related U.S. Application Data

(60) Provisional application No. 62/440,119, filed on Dec. 29, 2016.

(51) Int. Cl.
*G09F 3/08* (2006.01)
*A01G 9/00* (2018.01)
(Continued)

(52) U.S. Cl.
CPC .............. *A01G 9/006* (2013.01); *G09F 3/08* (2013.01); *G09F 3/206* (2013.01); *G09F 2003/0272* (2013.01)

(58) Field of Classification Search
CPC .................................. A01G 9/006; G09F 3/08
See application file for complete search history.

(56) References Cited

U.S. PATENT DOCUMENTS 1,803,214 A * 4/1931 Siegel ..................... A41F 11/02
24/698.3
2,515,827 A * 7/1950 Howard ................ F16B 5/0642
52/714

(Continued)

FOREIGN PATENT DOCUMENTS

AU        782165       7/2005
DE       3446855       8/1985
(Continued)

OTHER PUBLICATIONS

International Search Report and Written Opinion issued in corresponding IA No. PCT/US2017/068566 dated Apr. 23, 2018.
(Continued)

*Primary Examiner* — Jason W San

(57) ABSTRACT

A fastener device adapted for attaching at least one tag (or other identifier) to an object. The fastener device comprises a T-bar component, a paddle component, and a filament component flexibly attached to both the T-bar component on one end and the paddle component on the other end. In some embodiments, the fastener device is deployable via a fastener dispensing device comprising a needle designed to puncture a hole in at least one tag and the object while also inserting the T-bar component through the hole. Once inserted, the paddle component exerts a cantilever spring force against at least one tag holding the tag(s) securely against the object.

22 Claims, 4 Drawing Sheets

(51) Int. Cl.
*G09F 3/20* (2006.01)
*G09F 3/02* (2006.01)

(56) References Cited

U.S. PATENT DOCUMENTS

| | | | | |
|---|---|---|---|---|
| 3,532,212 A * | 10/1970 | Toth | ................ | A47B 95/04 |
| | | | | 206/343 |
| 4,347,932 A * | 9/1982 | Furutu | ................ | G09F 3/14 |
| | | | | 206/343 |
| D271,848 S * | 12/1983 | Tcherneshoff | ................ | D6/315 |
| 4,456,123 A * | 6/1984 | Russell | ................ | A41H 37/008 |
| | | | | 206/343 |
| 4,456,161 A * | 6/1984 | Russell | ................ | A41H 37/008 |
| | | | | 226/127 |
| 4,495,380 A * | 1/1985 | Ryan | ................ | F16B 21/082 |
| | | | | 174/138 D |
| 4,534,464 A * | 8/1985 | Lankton | ................ | G09F 3/14 |
| | | | | 206/343 |
| D286,166 S * | 10/1986 | Russell | ................ | 227/67 |
| 4,712,677 A * | 12/1987 | Russell | ................ | A41H 37/008 |
| | | | | 206/340 |
| D309,097 S * | 7/1990 | Price | ................ | D24/115 |
| 5,084,944 A * | 2/1992 | Hileman | ................ | E04F 13/0892 |
| | | | | 24/453 |
| 5,339,954 A * | 8/1994 | Kunreuther | ................ | B65C 7/003 |
| | | | | 206/343 |
| 5,463,799 A * | 11/1995 | Graham | ................ | B65C 7/003 |
| | | | | 24/704.1 |
| 5,758,987 A * | 6/1998 | Frame | ................ | F16B 21/082 |
| | | | | 403/298 |
| 5,987,719 A * | 11/1999 | Cooper | ................ | G09F 3/04 |
| | | | | 206/343 |
| 6,112,378 A * | 9/2000 | Lee | ................ | F16B 5/065 |
| | | | | 165/80.3 |
| 6,199,319 B1 | 3/2001 | Skinner | | |
| 6,220,434 B1 * | 4/2001 | Kubota | ................ | B65D 63/1081 |
| | | | | 140/93.2 |
| D464,563 S * | 10/2002 | Deschenes | ................ | D8/382 |
| 6,871,436 B2 | 3/2005 | Chen-Li et al. | | |
| 6,971,515 B2 * | 12/2005 | Cooper | ................ | B65C 7/005 |
| | | | | 206/343 |
| 8,240,073 B1 * | 8/2012 | Vulgamott | ............ | G09F 3/0288 |
| | | | | 40/645 |
| 9,659,509 B2 * | 5/2017 | Luea | ................ | A01G 9/006 |
| 10,098,286 B2 * | 10/2018 | Quinlan | ................ | A01G 9/006 |
| 10,510,273 B2 * | 12/2019 | Burout | ................ | G09F 3/08 |
| 10,839,720 B1 * | 11/2020 | Sjostrom | ................ | G09F 3/18 |
| 2004/0205940 A1 * | 10/2004 | Cooper | ................ | G09F 3/14 |
| | | | | 24/16 PB |
| 2006/0117532 A1 * | 6/2006 | Cooper | ................ | G09F 3/14 |
| | | | | 24/16 PB |
| 2007/0227067 A1 | 10/2007 | Sieverding | | |
| 2012/0279023 A1 * | 11/2012 | Burout | ................ | B29C 48/05 |
| | | | | 24/16 PB |
| 2012/0279100 A1 * | 11/2012 | Burout | ................ | B29C 48/05 |
| | | | | 40/299.01 |
| 2013/0134205 A1 * | 5/2013 | Cooper | ................ | B65C 7/003 |
| | | | | 227/68 |
| 2016/0358518 A1 * | 12/2016 | Burout | ................ | F16B 2/26 |
| 2017/0166370 A1 * | 6/2017 | Schuttler | ............ | B65D 63/1072 |
| 2017/0210528 A1 * | 7/2017 | Burout | ................ | B65D 63/1063 |

FOREIGN PATENT DOCUMENTS

| | | |
|---|---|---|
| EP | 0982231 | 3/2000 |
| GB | 2293588 | 4/1996 |
| JP | 2005176821 | 7/2005 |
| NL | 1007128 | 3/1999 |
| NL | 1011013 | 7/2000 |
| WO | 1993017412 | 9/1993 |
| WO | 2001029806 | 4/2001 |

OTHER PUBLICATIONS https://www.alibaba.com/product-detail/METO-Garden-Tagging-Tool_145243505.html.

International Preliminary Report on Patentability dated Jul. 11, 2019 issued in corresponding IA No. PCT/US2017/068566 filed Dec. 27, 2017.

* cited by examiner

HORTICULTURE FASTENER

CROSS-REFERENCE TO RELATED APPLICATION

The present application is a 371 of International Application No. PCT/US17/68566, which was published in English on Jul. 5, 2018, and claims the benefit of U.S. Provisional Patent Application No. 62/440,119 filed Dec. 29, 2016, both of which are incorporated herein by reference in their entireties.

The present disclosure relates generally to a fastener device. More particularly, the present disclosure relates to a fastener device for securely attaching at least one tag or a label to an object. The object may comprise plastic horticultural containers as well as other containers.

BACKGROUND

Fastening devices are commonly used in a wide variety of industries to attach tags, labels, or other identifiers to many different products. Traditional fasteners are often inserted through only a puncture in a material, such as cloth or fabric, because traditional tagging needles have a slot feature that creates a chord that does not pierce the material. Once the needle is removed, the punctured material collapses around the traditional fastener, minimizing the punctured hole diameter. While this process may work well with flexible products such as fabrics, it does not work well when attaching tags to more rigid materials such as plastics, cardboard, and the like.

In one application, fastening devices are used to attach to tags, labels, and other identifiers (collectively referred to as tags herein) to at least one object. At least one object may comprise pots and containers (collectively referred to as containers herein) holding flowers, herbs, vegetable plants, and other plants. For this application, the objects, including but not limited to containers, may be made of plastic, metal, wood, paper, peat, or some other material. The predominant traditional fastener used in the practice of tagging pots and containers used for potting plants, flowers, and other flora is a metal fastener, such as a hog ring, that can crimp a tag to the rim of a pot to secure the tag. The primary reason for using this type of fastener for this particular application is to keep the tag snug against the pot. When tags are not snuggly secured to the face of the pot, the tag(s) may be subject to premature tear off due to the whipping action associated with high wind conditions, friction forces, and other mechanical forces.

Thus, there exists a need for a fastener for use with planting containers typically used in the horticulture industry to withstand harsh exterior environments and mechanical stresses such as friction.

SUMMARY

The following presents a simplified summary in order to provide a basic understanding of some embodiments described in the detailed description. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a fastener device for securely attaching at least one tag to an object. The fastener device may comprise a T-bar component, a paddle component, and a filament component. The filament component may be flexibly connecting the T-bar component and the paddle component. The T-bar component may be initially oriented either substantially perpendicular or substantially parallel to the filament component.

Also disclosed herein is a method for attaching a fastener device. The method may comprise: 1) positioning a fastener device to at least one object wherein the fastener device comprises: (a) a T-bar component; (b) a filament component; and (c) a paddle component; 2) penetrating the fastener device and at least one object using a hollow needle of a fastener dispensing device; and 3) ejecting at least part of the fastener device through the hollow needle and out the sharpened tip so that the fastener device is at least partially secured to at least one object. In many embodiments, at least one object may be a container. The method may further comprise positioning at least one tag or identifier between the fastener device and at least one object prior to penetrating the fastener device and at least one object using a hollow needle of a fastener dispensing device.

Once the T-bar component is inserted through the holes (either pre-formed holes or holes punctured while attaching at least one tag to the object), the T-bar component springs back to its original orientation, thereby holding the fastener device in place. In some embodiments, at least a portion of the filament component may be inserted through the holes. During insertion, the paddle component may exert a spring-like force against at least one tag holding it snuggly against the object.

In one embodiment, the filament component comprises a first deflecting element connecting the filament component to the T-bar component (at the filament connecting point), and a second deflecting element connecting the filament component to the paddle component. The paddle component may be configured in a substantially M-shape and comprising a middle leg and a pair of outer legs. The paddle component may also be configured in a different shape as long as it is able support and hold at least one tag to at least one object. When the T-bar component is inserted through the holes in at least one tag and at least one object, the second deflecting element deflects to cantilever the pair of outer legs against the tag(s) thereby forcing it against the object.

In many embodiments, a fastener dispensing device may be used to attach at least one tag to at least one object. In further embodiments, a fastener dispensing device may be used to puncture holes in at least one tag and at least one object. The fastener dispensing device may then bend the T-bar component substantially parallel with the filament component for insertion through the holes. In some embodiments, the fastener dispensing device may be used to place at least one tag within a hole in the object in which the hole in the object was formed prior to its attachment to at least one tag. In other embodiments, at least one may have a pre-formed hole prior to its attachment to the object.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

These and other features, aspects and advantages are better understood when the following detailed description is read with reference to the accompanying drawings, in which.

DETAILED DESCRIPTION

Figure 1:
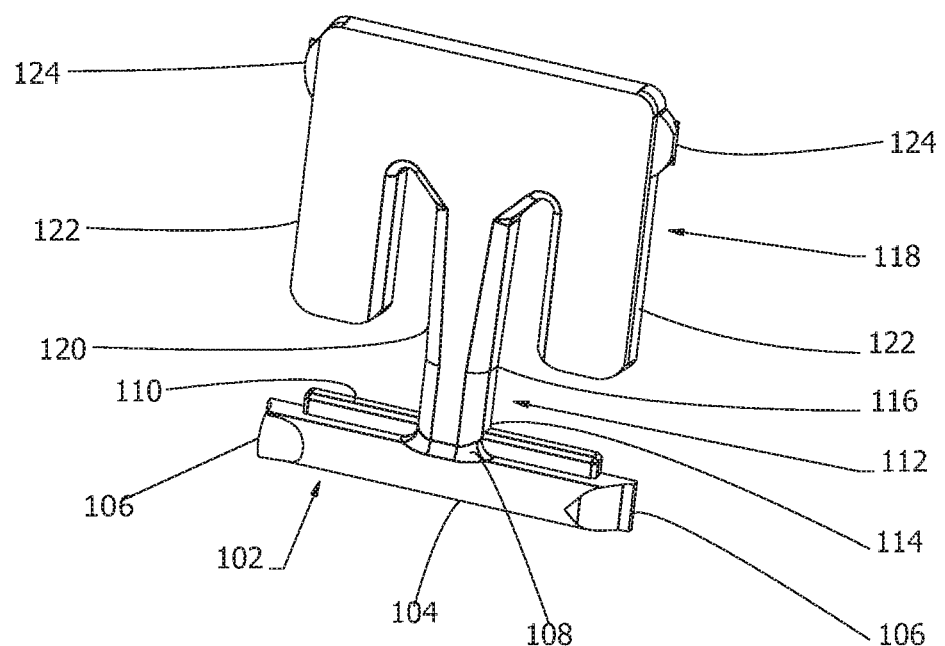
FIG. 1 illustrates a front perspective view of a fastener device in accordance with the disclosed architecture.

Embodiments will now be described more fully hereinafter with reference to the accompanying drawings in which example embodiments are shown. Whenever possible, the same reference numerals are used throughout the drawings to refer to the same or like parts. However, this disclosure may be embodied in many different forms and should not be construed as limited to the embodiments set forth herein.

Disclosed herein is a fastener device for securely attaching tag(s), label(s), and other identifier(s) (collectively referred to as tags herein) to objects. In other applications, the fastener device disclosed may hold or secure at least two different objects together. One application for use of the fastener device described herein is to attach tags to objects such as horticultural containers. The horticulture containers may include containers used for potting plants and flowers. However, the fastener device can also be used to attach tags to other rigid and non-rigid structures as well.

The containers used with the fastener device may be of various shapes and sizes. The fastener device described may accommodate these containers due to the flexibility of the fastener device. In one embodiment, more than one container may be attached to each other with the fastener device described herein. When more than one container may be attached to each other, at least one tag may also be attached.

In still further embodiments, the fastener device may be used to secure at least one tag to an object to avoid damaging the container. Further, the fastener device may be used to secure at least one tag to an object to resist any handling of the container (e.g., transporting, lifting, rotating, repositioning).

Once installed, the fastener device described herein may create a certain fit between the tag(s) and the item being tagged, such as a container, wherein at least one tag is positioned within the fastener device. In many embodiments, the tag(s) may be positioned within the filament component where the filament component is inserted through the hole(s) of the tag(s). In some instances, the fit between the tag(s) and container may be a snug fit such that the tag(s) may not be able to move or move very little. In other instances, the fit between the tag(s) and container may be a looser fit such that the tag(s) may be manipulated without being removed from its attachment from the fastener device. Additionally, the fastener device is strong enough to withstand harsh exterior environments and mechanical stresses such as friction. Further, a plurality of fastener devices are linkable together in a contiguous chain which may be singulated with the use of the fastener dispensing device as each individual fastener is deployed.

Unlike traditional fasteners described above, the fastener device disclosed herein utilizes a fastener dispensing device with a needle capable of creating a permanent opening in at least one tag and/or object or container for receipt of a portion of the fastener device. The fastener device may then provide a more secure attachment for at least one tag to an object. In some embodiments, at least one tag may at least partially contact the container when the fastener device described herein is used.

Figure 2A:
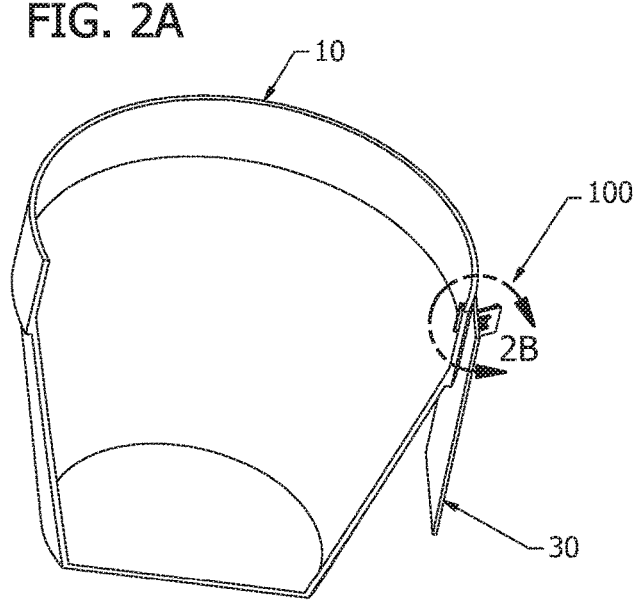
FIG. 2A illustrates a side elevational view of the fastener device attaching a tag to an object in accordance with the disclosed architecture.
Figure 2B:
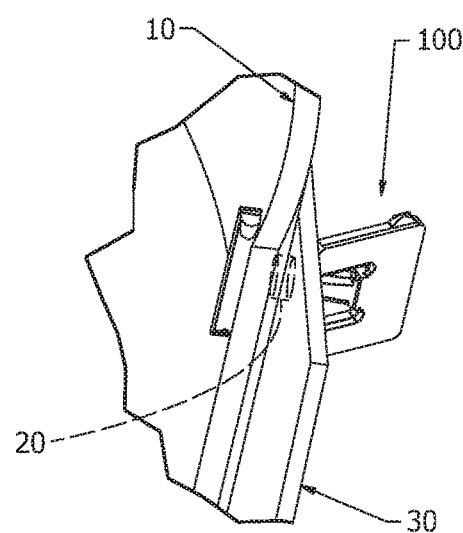
FIG. 2B illustrates cut away view of the fastener device attaching the tag to the object in accordance with the disclosed architecture.
Figure 3:
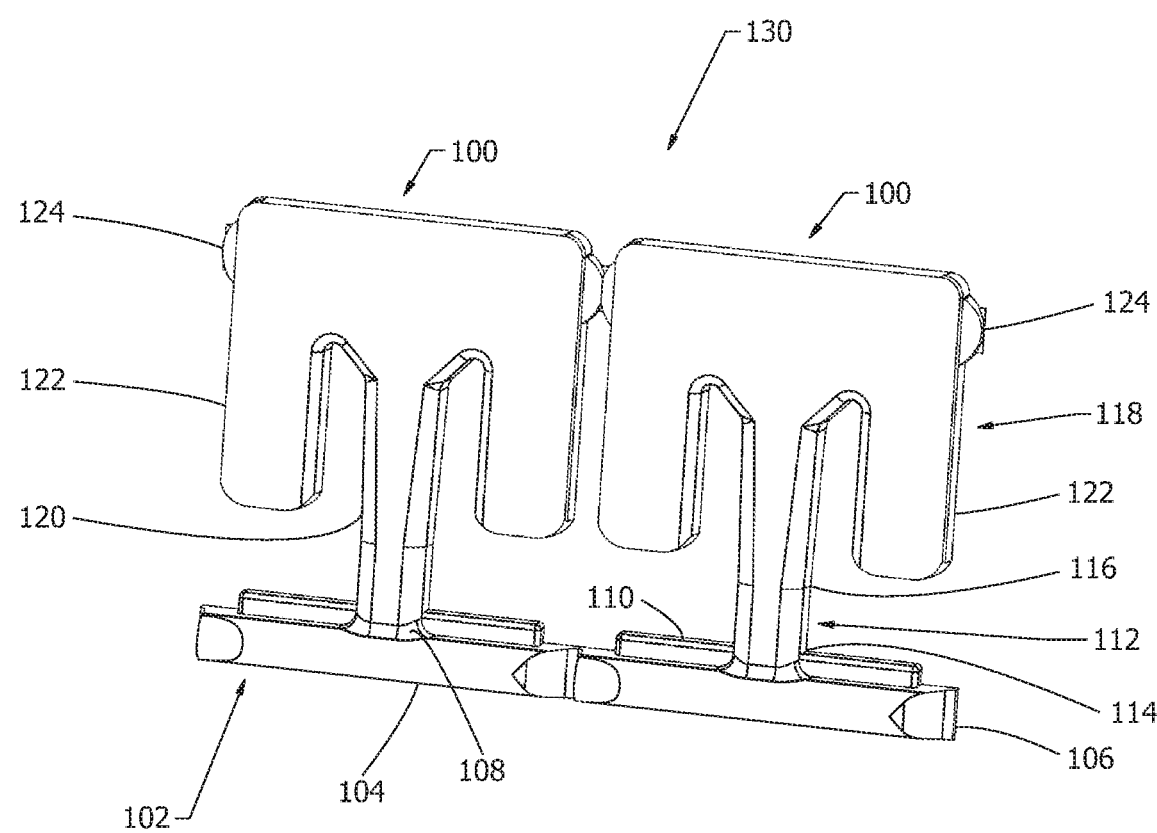
FIG. 3 illustrates a contiguous chain of fastener devices in accordance with the disclosed architecture.

Referring initially to the drawings, FIGS. 1-3 illustrate an example embodiment of a fastener device 100 in accordance with what is disclosed herein. The fastener device 100 may comprise a T-bar component 102, a paddle component 118, and a filament component 112. In many embodiments, the filament component 112 may be flexibly attached or connected to the T-bar component 102 and the paddle component 118. The fastener device 100 may be manufactured from plastic or a similar material with a tensile strength adequate for heavy duty fastening operations such as attaching at least one tag to at least one object. In many embodiments, the fastener device 100 may be comprised of at least one of polypropylene, nylon, PET, polyurethane, recyclable plastics, bio-based plastics, and biodegradable plastics, PHA, PHB, and PVA materials. In some embodiments, the fastener device may be comprised of at least one material of polypropylene and nylon.

The T-bar component 102 may comprise a main bar element 104, and a filament connecting point 108. In some embodiments, the main bar element 104 may be rigid and in configuration to fit into a hollow needle (not shown). The main bar element 104 may be a number of different shapes, including but not limited to cylindrical, square, rectangular, triangular, and others. In other embodiments, the main bar element 104 may be flexible for certain applications.

In some embodiments, the T-bar component 102 may further comprise a rib element 110. The rib element 110 abuts and is rigidly affixed to the main bar element 104 along its length to provide additional strength and rigidity. The filament connecting point 108 is located on the main bar element 104 approximately midway along its length. In some embodiments, the filament connecting point 108 may be rigid or semi-rigid. In other embodiments, the filament connecting point 108 may be more flexible. The main bar element 104 comprises a pair of geometric end features 106 (the pair is shown in FIG. 1 of the drawings) which may enable the fastener device 100 to be deployed by the fastener dispensing device (described below). The geometric end features 106 may be a variety of different shapes and sizes depending on the end use of the fastener device 100.

The T-bar component 102 may be initially oriented either substantially perpendicular or substantially parallel to the filament component. The T-bar component 102 may vary in length and shape to accommodate different tags. The T-bar component 102 may also vary in length and shape to accommodate different containers.

The paddle component 118, as shown in FIG. 1, may be configured in a generally M-shaped profile. In many embodiments, the paddle component 118 may comprise a middle leg 120 and a pair of outer legs 122. The pair of outer legs 122 may be configured to extend inward toward the T-bar component 102. Each of the pair of outer legs 122 comprise an attachment tab 124 located on an outer side of the corresponding outer leg for attaching the plurality of the fastener devices 100 together. The paddle component 118 may vary in length and shape to accommodate different tags.

The paddle component 118 may also vary in length and shape to accommodate different objects or containers.

The filament component 112 comprises a first deflecting element 114 and a second deflecting element 116. In many embodiments, the first deflecting element 114 and the second deflecting element 116 flexibly connect the filament component 112 to the T-bar component 102 and to the paddle component 118. The first deflecting element 114 is flexibly connected to the filament connecting point 108 of the T-bar component 102 and may be oriented substantially perpendicular to the main bar element 104. In other embodiments, the filament connecting point 108 of the T-bar component 102 and may be oriented substantially parallel to the main bar element 104. The second deflecting element 116 flexibly connects the middle leg 120 of the paddle component 118 to the filament component 112. The second deflecting element 116 may flexibly connect to the middle leg 120 of the paddle component 118 to the filament component 112 in either substantially parallel or substantially perpendicular to the filament component 112. In some embodiments, the first deflecting element 114 and the second deflecting element 116 may each function as a living hinge. The filament component may vary in length and shape to accommodate different tags. The filament component may also vary in length and shape to accommodate different containers.

In one embodiment, the fastener device for attaching at least one tag to an object comprises: 1) a T-bar component comprising a main bar element, and a filament connecting point; 2) a filament component comprising a first deflecting element and a second deflecting element, wherein the first deflecting element flexibly connects the filament component to the T-bar component; and 3) a paddle component, wherein the second deflecting element flexibly connects the middle leg to the filament component. Further, the pair of outer legs (described above) may exert a cantilever spring force against the at least one tag and the container to at least partially secure the at least one tag to the container. In many embodiments, the second deflecting element may deflect to force the pair of outer legs to push the at least one tag against the object as the main bar element is substantially inserted through at least one tag and at least one object.

Having described an embodiment of the structure of the fastener device 100, its use will now be generally described as illustrated in FIGS. 2A, 2B and 3. As shown in FIGS. 2A and 2B, the fastener device 100 may be used for attaching at least one tag 30 to an object 10. The object 10 may be a horticultural container such as but not limited to plastic pots, planters, flower containers, seed containers, and the like. In some embodiments, the fastener device 100 may also be used to attach tags to other objects not related to horticulture.

Once the fastener device 100 is attached to the object 10, at least one tag 30 may be in at least partial contact with the object 10. In many embodiments, at least one tag 30 may be in at least partial contact with the filament component 112 (shown in FIG. 1) of the fastener device 100. In some embodiments, at least one tag 30 may be in at least partial contact with the T-bar component 102 of the fastener device 100. In other embodiments, at least one tag 30 may be in at least partial contact with the paddle component 118 of the fastener device 100.

In many embodiments, the plurality of the fastener devices 100 may be attached via the geometric end features 106 and the plurality of attachment tabs 124 forming the contiguous chain of fastener devices 130 (as shown in FIG. 3). Further, the plurality of the fastener devices 100 may be connected together for use in a fastener dispensing device.

In many embodiments, at least one additional fastener devices may be connected at the geometric end features 106 and the attachment tabs 124 to form a contiguous chain (or stock) of fastener devices 130. The contiguous chain of fastener devices 130 may then be configured to be used with a fastener dispensing device having a needle to place the tag(s) onto the object. In some embodiments, the contiguous chain of fastener devices may have at least 500 fasteners per roll. In other embodiments, the chain of fastener devices may have at least 1000 fasteners per roll.

The contiguous chain of fastener devices 130 may then be loaded into the fastener dispensing device with a needle. At least one tag 30 may be placed adjacent to a rim or sidewall of the object 10. The needle is used to puncture holes 20 in both the tag(s) 30 and/or the object 10. In some embodiments, the needle will puncture full diameter round holes. In some embodiments, the hole may be a shape other than round. In other embodiments, at least one tag 30 and/or at least one object 10 may have pre-formed holes prior to attachment. The fastener dispensing device singulates a fastener device 100 from the chain 130 by cutting the geometric end features 106 and the attachment tabs 124 between individual fastener devices 100. The fastener dispensing device then ejects the T-bar component 102 into an inner diameter of the needle.

As the T-bar component 102 passes through the needle and the holes 20, the first deflecting element 114 deflects or bends so that the filament component 112 moves to a substantially parallel orientation with the T-bar component 102. In many embodiments, the first deflecting element 114 deflects the main bar element 104 substantially parallel to the filament component 114 for insertion through at least one tag and at least one object. In many embodiments, the first deflecting element 114 may relax to allow the main bar element 104 to become substantially perpendicular to the filament component 112 again once the main bar element is substantially inserted. Once the T-bar component 102 is completely ejected through the needle, the first deflecting element 114 relaxes and toggles or springs back to its original orientation so that the filament component 112 is again substantially perpendicular to the T-bar component 102. The T-bar component 102 then at least partially engages an inner surface of the object 10 to prevent the T-bar component 102 from moving back through the holes 20.

As further illustrated in FIG. 2B, as the T-bar component 102 is inserted through the holes 20, the second deflecting element 116 simultaneously deflects to force the pair of outer legs 122 of the paddle component 118 against the tag 30 and the object 10. Although only one tag 30 is shown in FIG. 2B, more than one tag may be used with the fastener device described herein. As the T-bar component 102 reorients into its original perpendicular orientation with the filament component 112, the pair of outer legs 122 partially relax, but remain cantilevered against the tag 30 and the object 10. This cantilever spring force adjustably, yet snugly, affixes the tag 30 to the object 10. This adjustable cantilever design allows the fastener device 100 to be effective for a variety of sidewall and rim thicknesses without the need for different sized fasteners.

Also disclosed herein is a method for attaching a fastener device. In many embodiments, the method for attaching a fastener device may comprise (1) positioning a fastener device to at least one object wherein the fastener device comprises a T-bar component; a filament component; and a paddle component; (2) penetrating the fastener device and at least one object using a hollow needle of a fastener dispensing device; and (3) ejecting at least part of the fastener device through the hollow needle and out the sharpened tip so that the fastener device is at least partially secured to at least one object.

In many embodiments, at least one object is a container. The method described herein may further comprise positioning at least one tag between the fastener device and at least one object prior to penetrating the fastener device and at least one object using a hollow needle of a fastener dispensing device.

In other embodiments, the method may comprise: 1) positioning a fastener device to at least one object wherein the fastener device comprises: (a) a T-bar component; (b) a filament component; and (c) a paddle component; 2) penetrating the fastener device and at least one object using a hollow needle of a fastener dispensing device; and 3) ejecting at least part of the fastener device through the hollow needle and out the sharpened tip so that the fastener device is at least partially secured to at least one object. In many embodiments, at least one object may be an object. The method may further comprise positioning at least one tag or identifier between the fastener device and at least one object prior to penetrating the fastener device and at least one object using a hollow needle of a fastener dispensing device.

In some embodiments, the fastener device 100 may be attached through the needle of the fastener dispensing device positioned inside the container. In other applications, the fastener device 100 may be attached through the needle of the fastener dispensing device positioned outside the container. Further, a fastener dispensing device for attaching at least one tag to at least one object may deploy the fastener device disclosed herein. The fastener dispensing device may comprise a feed mechanism for advancing the fastening device and a cutting mechanism for separating the individual fastening device from a continuous chain of fastener devices, wherein the fastener device for attaching at least one tag to at least one object comprises: (1) a T-bar component; (2) a filament component; and (3) a paddle component. In many embodiments, the filament component is flexibly attached to the T-bar component and the paddle component.

In many embodiments, the fastening dispensing device is employed on the object where the object is a container. In many embodiments, the contiguous chain of fastener devices is at least 500 fastener devices. In other embodiments, the contiguous chain of fastener devices is at least 1000 fastener devices.

Figure 4:
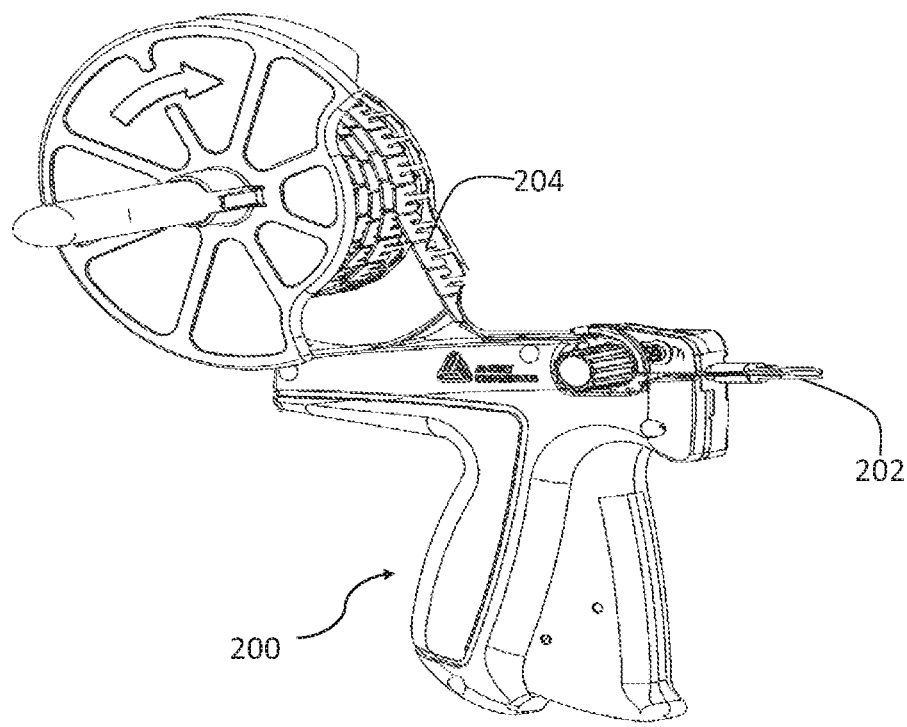
FIG. 4 illustrates a fastener dispensing device in accordance with the disclosed architecture.

The fastener device disclosed herein may be used with the fastener dispensing device 200, which is provided in FIG. 4. The fastener dispensing device may be designed to deploy the fastener through at least one tag and at least one object (like a container) via a hollow needle 202 of the fastener dispensing device 200. The fastener device may be provided as a contiguous chain of fastener devices 204. In some embodiments, the fastener dispensing device may deploy the fastener device, forming a hole in at least one tag and/or at least one object (or container). In some embodiments, at least one tag and/or at least one object (or container) has a pre-formed hole prior to attachment of the fastener device.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A fastener device for attaching at least one tag to at least one object comprising:
    a T-bar component;
    a filament component; and
    a paddle component comprising a pair of outer legs and a middle leg having separation from each other, the pair of outer legs being shorter than the middle leg, and the pair of outer legs each having a free end,
    wherein the filament component is flexibly attached to the T-bar component and the paddle component.

2. The fastener device of claim 1, wherein the T-bar component comprises a main bar element and a filament connecting point.

3. The fastener device of claim 2, wherein the filament connecting point is located substantially midway along the main bar element.

4. The fastener device of claim 2, wherein the filament component comprises a first deflecting element.

5. The fastener device of claim 4, wherein the first deflecting element flexibly connects the filament component to T-bar component at the filament connecting point.

6. The fastener device of claim 5, wherein the first deflecting element relaxes to allow the main bar element to become substantially perpendicular to the filament component once the main bar element is substantially inserted.

7. The fastener device of claim 5, wherein the first deflecting element deflects the main bar element substantially parallel to the filament component for insertion through at least one tag and at least one object.

8. The fastener device of claim 4, wherein the filament component further comprises a second deflecting element.

9. The fastener device of claim 8, wherein the second deflecting element flexibly connects the middle leg of the paddle component to the filament component.

10. The fastener device of claim 8, wherein the second deflecting element deflects to force the pair of outer legs to push the at least one tag against at least one object as the main bar element is substantially inserted through at least one tag and at least one object.

11. The fastener device of claim 2, wherein the T-bar component further comprises a rib element affixed to the main bar element.

12. The fastener device of claim 1, wherein the paddle component configured in a substantially M-shaped profile.

13. The fastener device of claim 1, wherein each of the pair of outer legs extend inward toward the T-bar component.

14. A fastener device for attaching at least one tag to at least one object comprising:
    a T-bar component comprising a main bar element, a filament connecting point, and a rib element affixed to the main bar element;
    a filament component connected to the filament connecting point; and
    a paddle component comprising a pair of outer legs and a middle leg having separation from each other, the pair of outer legs being shorter than the middle leg, and the pair of outer legs each having a free end, wherein the paddle component is connected to the filament component.

15. The fastener device of claim 14, wherein each of the pair of outer legs comprise an attachment tab.

16. The fastener device of claim 14, wherein the main bar element comprises a pair of geometric end features.

17. The fastener device of claim 16, wherein the attachment tabs and the pairs of geometric end features connect the fastener device to at least one additional fastener devices to form a contiguous chain of fastener devices.

18. The fastener device of claim 14, wherein the filament component comprises a first deflecting element and a second deflecting element.

19. The fastener device of claim 18, wherein the first deflecting element and the second deflecting element flexibly connect the filament component to the T-bar component and to the paddle component.

20. The fastener device of claim 14, wherein the paddle component is configured in a substantially M-shaped profile.

21. The fastener device of claim 14, wherein the fastener device is comprised of plastic.

22. The fastener device of claim 14, wherein the fastener device is comprised of at least one material of polypropylene, nylon, PET, polyurethane, recyclable plastics, bio-based plastics, and biodegradable plastics, PHA, PHB, and PVA materials.

* * * * *